US012409902B2

(12) United States Patent
Kim et al.

(10) Patent No.: US 12,409,902 B2
(45) Date of Patent: Sep. 9, 2025

(54) LINK STRUCTURE FOR WHEEL

(71) Applicants: Hyundai Motor Company, Seoul (KR); Kia Corporation, Seoul (KR)

(72) Inventors: Hunkee Kim, Hwaseong-si (KR); Seungmo Ko, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/929,067

(22) Filed: Oct. 28, 2024

(65) Prior Publication Data

US 2025/0162665 A1 May 22, 2025

(30) Foreign Application Priority Data

Nov. 20, 2023 (KR) .......................... 10-2023-0160490

(51) Int. Cl.
*B62D 61/12* (2006.01)
*B62D 63/04* (2006.01)
(52) U.S. Cl.
CPC ............. *B62D 61/12* (2013.01); *B62D 63/04* (2013.01)
(58) Field of Classification Search
CPC .................................. B62D 1/12; B62D 63/04
See application file for complete search history.

(56) References Cited

U.S. PATENT DOCUMENTS

| 6,945,832 | B2 * | 9/2005 | Roycroft | B62D 61/12 |
| | | | | 440/12.66 |
| 7,306,247 | B2 * | 12/2007 | Wu | A61G 5/06 |
| | | | | 280/124.13 |
| 10,023,252 | B1 * | 7/2018 | Bjone | B62D 61/12 |
| 11,040,589 | B2 * | 6/2021 | Ishikawa | B60G 7/02 |
| 11,260,922 | B2 * | 3/2022 | Ishikawa | B62D 61/12 |
| 11,524,735 | B2 * | 12/2022 | Ishikawa | B25J 5/007 |

FOREIGN PATENT DOCUMENTS

CN 211810028 U 10/2020

* cited by examiner

*Primary Examiner* — Faye M Fleming
(74) *Attorney, Agent, or Firm* — Slater Matsil, LLP

(57) ABSTRACT

An embodiment link structure for a wheel of a vehicle includes a first link having a first end connected to a center of the wheel, a second link having a first end connected to a second end of the first link, a third link having a first end connected to a second end of the second link, a gear part connected to a second end of the third link and configured to allow the third link to move rectilinearly, and a motor part connected to the gear part and configured to provide a rotational force to the gear part.

20 Claims, 12 Drawing Sheets

62

64

LINK STRUCTURE FOR WHEEL

CROSS-REFERENCE TO RELATED APPLICATIONS

This application claims the benefit of Korean Patent Application No. 10-2023-0160490, filed on Nov. 20, 2023, which application is hereby incorporated herein by reference.

TECHNICAL FIELD

The present disclosure relates to a link structure for a wheel.

BACKGROUND

Recently, future mobility visions with new concepts for implementing human-oriented dynamic future cities have been introduced in vehicle industries. One of the future mobility solutions is a purpose-built vehicle (PBV) as a purpose-based mobility vehicle.

Examples of the PBV may include an environmentally friendly movable vehicle based on an electric vehicle (EV). The PBVs may provide various customized services to users while the PBVs move from starting points to destinations in an unmanned or manned autonomous driving manner.

The PBV may include a cab-type drive module equipped with a drive device and capable of autonomously traveling and a space module coupled to the drive module and configured to be used for cargo, passengers, home office, or the like.

The drive module has an auxiliary wheel in addition to a main wheel. In a state in which the drive module is separated from the space module, the drive module may individually travel by using the main wheel and the auxiliary wheel. In case that the drive module is fastened to the space module, the auxiliary wheel is contained at an upper side of the vehicle by using a link structure.

FIG. 1 is a view illustrating a vehicle that adopts a link structure for a wheel in the related art, and FIG. 2 is an enlarged view illustrating the link structure for a wheel in the related art.

As illustrated in FIGS. 1 and 2, a link structure for an auxiliary wheel in the related art includes a first link 12 having one end connected to an auxiliary wheel 10, a second link 13 having one end connected to the other end of the first link, third and fourth links 14 and 15 configured to connect the other end of the second link 13 and lateral portions of a drive module of a vehicle body, a fifth link 16 configured to connect a connection portion between the third link 14 and the fourth link 15 to an upper portion of the drive module of the vehicle body, and a motor 20 provided at an end of the fifth link 16.

When the motor 20 operates to operate the fifth link 16 so that a length of the fifth link 16 increases or decreases, the third link 14 and the fourth link 15, which are connected to the fifth link 16, operate, such that the second link 13 and the first link 12 operate so that the auxiliary wheel 10 moves to an upper or lower end of the vehicle body. Because the link structure requires a large number of links, the link structure is complicated, and a space occupied by the vehicle body needs to be large.

SUMMARY

The present disclosure relates to a link structure for a wheel. Particular embodiments relate to a link structure for an auxiliary wheel, which is capable of moving an auxiliary wheel provided in a drive module in a PBV.

Embodiments of the present disclosure provide a link structure for an auxiliary wheel, which is made compact in structure by reducing the number of components so that an auxiliary wheel may be moved to be contained or withdrawn when a drive module and a space module of a PBV are fastened or separated.

A link structure for a wheel according to an embodiment of the present disclosure is configured to move a wheel for a vehicle and contain or withdraw the wheel and includes a first link having one end connected to a center of the wheel, a second link having one end connected to the other end of the first link, a third link having one end connected to the other end of the second link, a gear part connected to the other end of the third link and configured to allow the third link to rectilinearly move, and a motor part connected to the gear part and configured to provide a rotational force to the gear part.

The other end of the first link and one end of the second link may be connected to a link fixing part, which is provided on a lateral portion of the vehicle body, and turnable in an upward/downward direction of the vehicle body while sharing the same rotation axis.

The gear part may be fixedly installed at a rear end of the vehicle body toward a rear side of the vehicle body.

The gear part may include a gear fixing part fixedly installed on the vehicle body and having an opening formed in a central portion and extending in a longitudinal direction of the vehicle body, a rotary shaft inserted into the opening of the gear fixing part and configured to rotate in the opening, and a rotary gear provided at an end of the rotary shaft and having an outer peripheral surface on which gear teeth are formed and an inner peripheral surface on which a gear screw thread is formed.

The gear part may further include a ball bearing interposed between the rotary shaft and the opening and configured to support the rotary shaft so that the rotary shaft rotates.

The third link may be inserted into the inner peripheral surface of the rotary gear and may operate to rectilinearly move in a forward/rearward direction of the vehicle body in accordance with a rotation of the rotary gear.

A link screw thread may be formed on an outer peripheral surface of the third link and coupled to a gear screw thread formed on an inner peripheral surface of the rotary gear.

The motor part may include a motor fixedly installed on the vehicle body above the link fixing part and a motor gear connected to the rotary shaft of the motor and protruding toward the rotary gear of the gear part.

The rotary gear of the gear part may be disposed to be in contact with and engage with the motor gear.

When the motor gear rotates as the motor operates, the rotary gear of the gear part may rotate, and the third link coupled to the rotary gear of the gear part may rectilinearly move, such that the first link and the second link may operate to turn in an upward/downward direction of the vehicle body.

The vehicle may include a drive module and a space module detachably attached to a rear side of the drive module.

The wheel may be an auxiliary wheel provided at a rear side of the drive module, the auxiliary wheel may be turned upward and contained in a wheel containing part provided in the space module when the drive module and the space module are coupled, and the auxiliary wheel may be turned downward and exposed from a lower portion of the vehicle body when the drive module and the space module are uncoupled.

A first spring stopper may be wound around a rotary shaft between an outer surface of the other end of the first link and an inner surface of the link fixing part and may provide an elastic force to assist in fixing the wheel.

A second spring stopper having two opposite ends, which are respectively fixed to an outer surface of the other end of the first link and an inner surface of the link fixing part, may be installed to provide an elastic force to assist in fixing the wheel.

According to embodiments of the present disclosure, the compact link structure is applied to contain the auxiliary wheel provided on the drive module when the drive module and the space module of the PBV are coupled to each other, thereby significantly reducing the occupation space.

In addition, the number of components of the link structure may be reduced, which may reduce the total weight and costs.

In addition, the simple operating method may be applied, which may improve durability and reduce the probability of a device being broken down.

DETAILED DESCRIPTION OF ILLUSTRATIVE EMBODIMENTS

Figure 1:
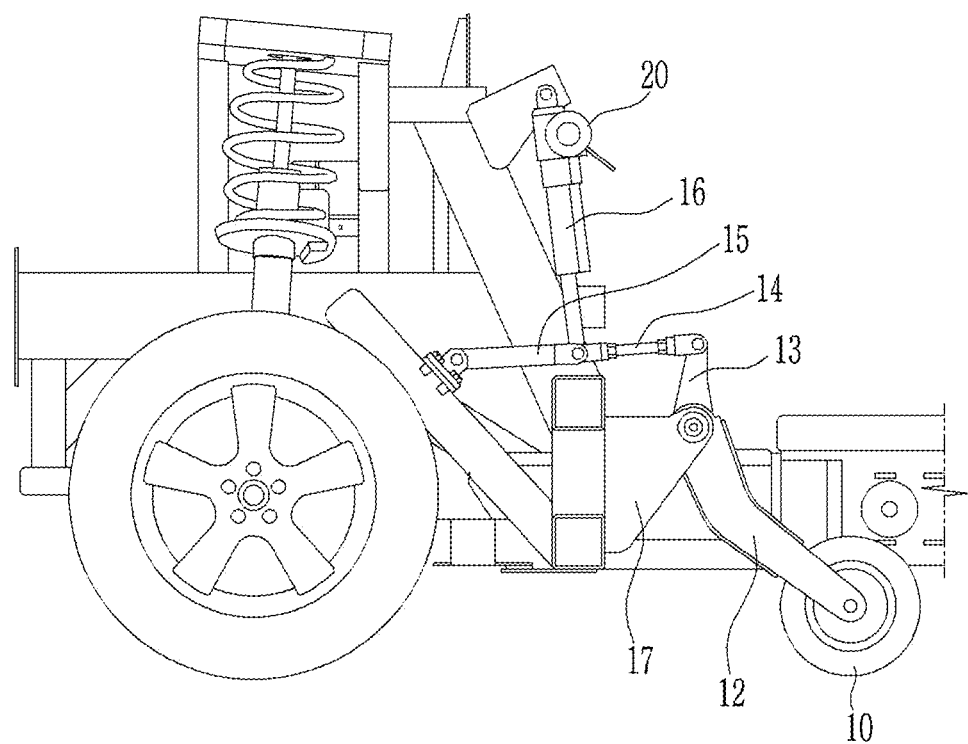
FIG. 1 is a view illustrating a vehicle that adopts a link structure for a wheel in the related art.
Figure 2:
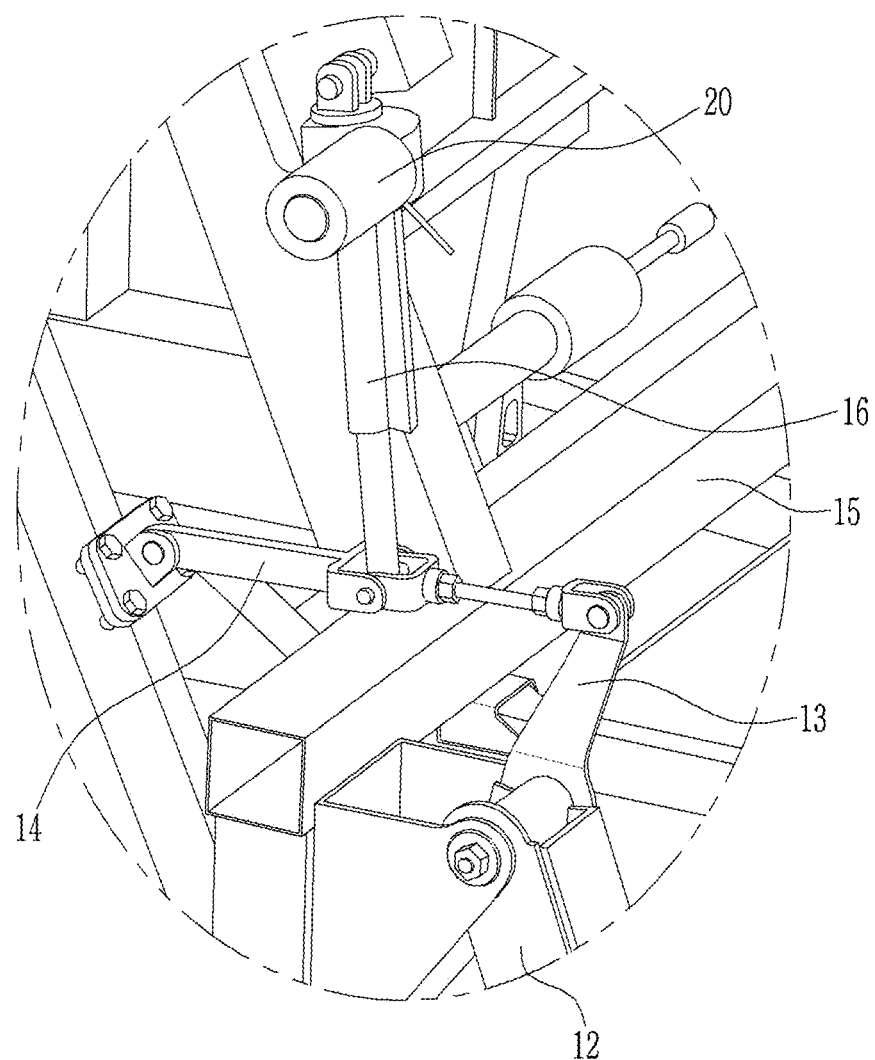
FIG. 2 is an enlarged view illustrating the link structure for a wheel in the related art.

Hereinafter, embodiments of the present disclosure will be described in detail with reference to the accompanying drawings so that those with ordinary skill in the art to which the present disclosure pertains may easily carry out the embodiments. The present disclosure may be implemented in various different ways and is not limited to the embodiments described herein.

In addition, the constituent elements having the same configurations in several embodiments will be assigned with the same reference numerals and described only in the representative embodiment, and only the constituent elements, which are different from the constituent elements according to the representative embodiment, will be described in other embodiments.

It is noted that the drawings are schematic and are not illustrated based on actual scales. Relative dimensions and proportions of parts illustrated in the drawings are exaggerated or reduced in size for the purpose of clarity and convenience in the drawings, and any dimension is just illustrative but not restrictive. Further, the same reference numerals designate the same structures, elements, or components illustrated in two or more drawings in order to exhibit similar characteristics. When one component is described as being positioned "above" or "on" another component, one component can be positioned "directly on" another component, and one component can also be positioned on another component with other components interposed therebetween.

The embodiments of the present disclosure specifically illustrate example embodiments of the present disclosure. As a result, various modifications of the drawings are expected. Therefore, the embodiments are not limited to specific forms in regions illustrated in the drawings, and for example, include modifications of forms by the manufacture thereof.

Hereinafter, a link structure for a wheel according to embodiments of the present disclosure will be described in detail with reference to the accompanying drawings.

Figure 3:
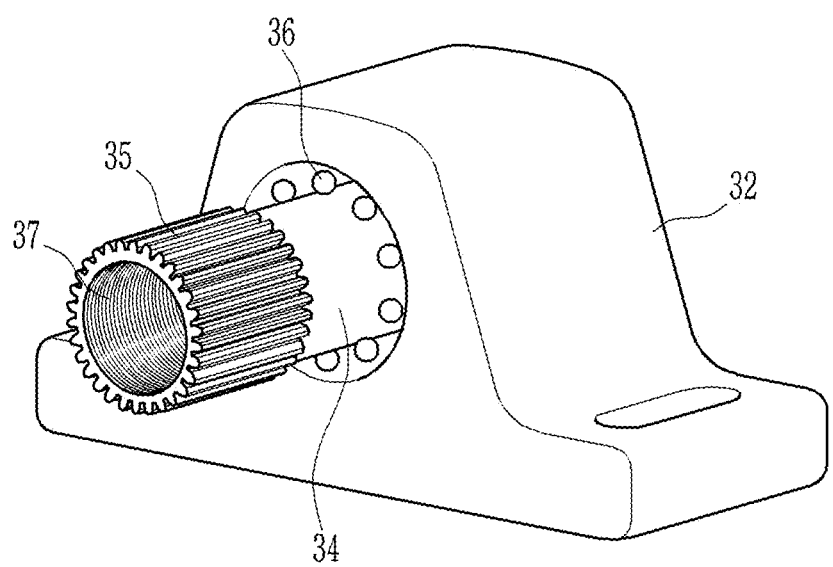
FIG. 3 is a view illustrating a gear part according to an embodiment of the present disclosure.
Figure 4:
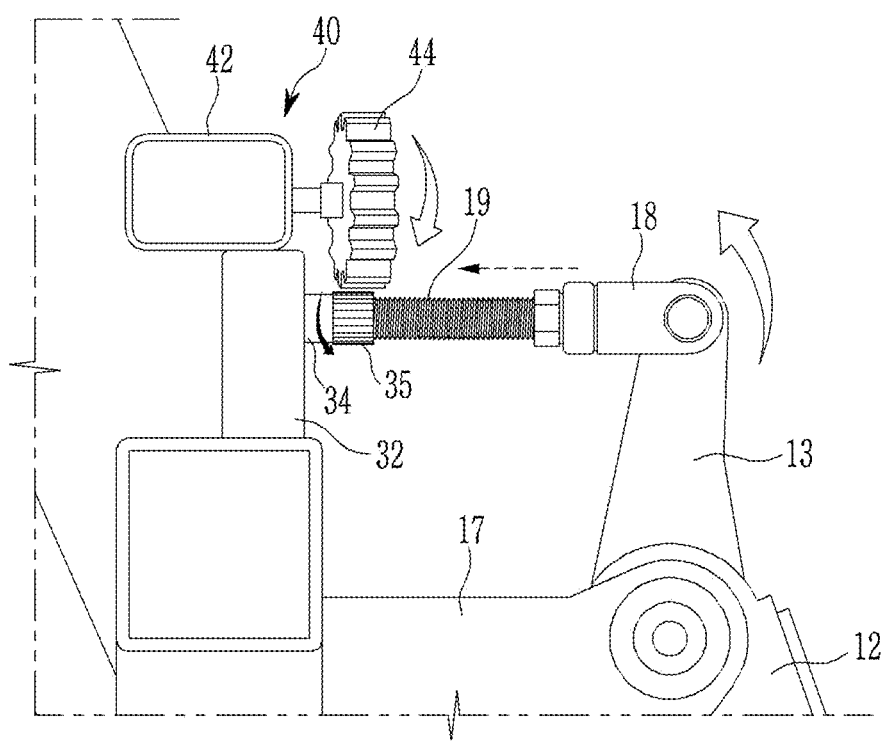
FIG. 4 is a view illustrating a connection relationship between a gear part and a motor part according to an embodiment of the present disclosure.
Figure 5:
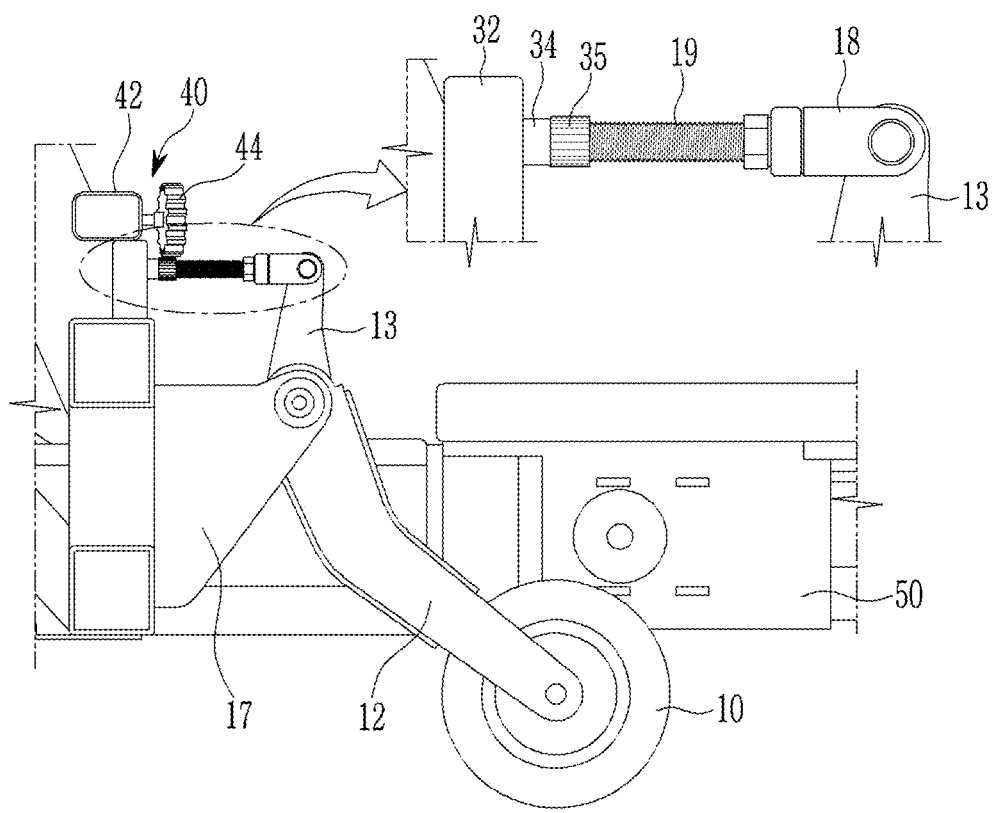
FIG. 5 is a view illustrating a state before a wheel is contained in a link structure for a wheel according to an embodiment of the present disclosure.

FIG. 3 is a view illustrating a gear part according to an embodiment of the present disclosure, FIG. 4 is a view illustrating a connection relationship between a gear part and a motor part according to an embodiment of the present disclosure, and FIG. 5 is a view illustrating a state before a wheel is contained in a link structure for a wheel according to an embodiment of the present disclosure.

With reference to FIGS. 3 to 5, the link structure for a wheel according to an embodiment of the present disclosure is related to an articulated link structure configured to contain or withdraw a wheel 10 by moving the wheel 10 for a vehicle in an upward/downward direction. For example, the vehicle may be applied to a purpose-built mobility vehicle (hereinafter, referred to as a 'PBV').

In the present disclosure, an embodiment will be described in which the link structure is applied to an auxiliary wheel 10 provided in a drive module 100 in the PBV including the drive module 100 and a space module 200 configured to be attached to or detached from a rear side of the drive module 100. However, the present disclosure is not limited thereto. The link structure may be applied to a general vehicle wheel and used as a device for containing or withdrawing the wheel.

The PBV may be used as a life module vehicle based on an electric vehicle that provides a user with various customized services while the PBV moves from a starting point to a destination. A vehicle body of the PBV is a vehicle body suitable for small-quantity production of various types of vehicles having a small number of components. The vehicle body of the PBV may be manufactured to have various shapes and sizes.

The link structure for a wheel according to an embodiment of the present disclosure may include three links 12, 13, and 18, a gear part 30, and a motor part 40. The links 12, 13, and 18 include a first link 12 having one end connected to a center of the wheel 10, a second link 13 having one end connected to the other end of the first link 12, and a third link 18 having one end connected to the other end of the second link 13.

The other end of the first link 12 and one end of the second link 13 are connected to a link fixing part 17, which is provided on a lateral portion of a vehicle body, and are configured to be turnable in the upward/downward direction of the vehicle body while sharing the same rotation axis. The first link 12 and the second link 13 may turn while maintaining the same angle and turn about a rotation shaft provided on the link fixing part 17.

One end of the third link 18 is connected to the other end of the second link 13, and the third link 18 is disposed in a horizontal direction of the vehicle body. The other end of the third link 18 is connected to the gear part 30.

The gear part 30 may allow the third link 18 to rectilinearly move in a longitudinal direction of the vehicle body, and the third link 18 disposed at a rear side of the vehicle body may be connected to a rear end of the vehicle body.

As illustrated in FIG. 4, the gear part 30 includes a gear fixing part 32 fixedly installed on the vehicle body, a rotary shaft 34 rotatably connected to the gear fixing part 32, and rotary gears 35 and 37 provided at an end of the rotary shaft 34.

A lower portion of the gear fixing part 32 is fixedly installed on the vehicle body, and an opening is formed in an upper portion of the gear fixing part 32 and extends in the longitudinal direction of the vehicle body. The rotary shaft 34 may be inserted into the opening, and the rotary shaft 34 may rotate in the opening. A ball bearing 36 may be further provided between the rotary shaft 34 and the opening and support the rotary shaft 34 so that the rotary shaft 34 rotates smoothly.

The rotary gears 35 and 37 may be formed by forming gear teeth 35 on an outer peripheral surface and forming a gear screw thread 37 on an inner peripheral surface. The third link 18 may be inserted into the inner peripheral surface of the rotary gears 35 and 37 and may operate to rectilinearly move in a forward/rearward direction of the vehicle body in accordance with rotations of the rotary gears 35 and 37. A link screw thread 19 may be formed on an outer peripheral surface of the third link 18, and the link screw thread 19 may be coupled to the gear screw thread 37 formed on the inner peripheral surface. Therefore, the third link 18 may be rectilinearly moved by the rotations of the rotary gears 35 and 37 in a state in which the link screw thread 19 engages with the gear screw thread 37.

The motor part 40 includes a motor 42 and a motor gear 44. The motor 42 is fixedly installed on the vehicle body disposed above the link fixing part 17, and a rotary shaft of the motor 42 rotates when the motor 42 operates. The motor gear 44 is connected to the rotary shaft of the motor 42 and protrudes toward the rotary gears 35 and 37 of the gear part 30.

The motor gear 44 is disposed to be in contact with the rotary gears 35 and 37 of the gear part 30 and engages with the rotary gears 35 and 37 of the gear part 30. That is, when the rotary shaft of the motor 42 and the motor gear 44 rotate as the motor 42 operates, the rotary gears 35 and 37 of the gear part 30, which are disposed to engage with the motor gear 44, rotate. Then, the third link 18 connected to the inner peripheral surface of the rotary gears 35 and 37 rectilinearly moves in the forward/rearward direction of the vehicle body, turns the second link 13 in accordance with the movement of the third link 18, and also turns the first link 12 connected to the second link 13. The wheel 10 is moved in the upward/downward direction by the turning of the second link 13 and the first link 12.

Figure 6:
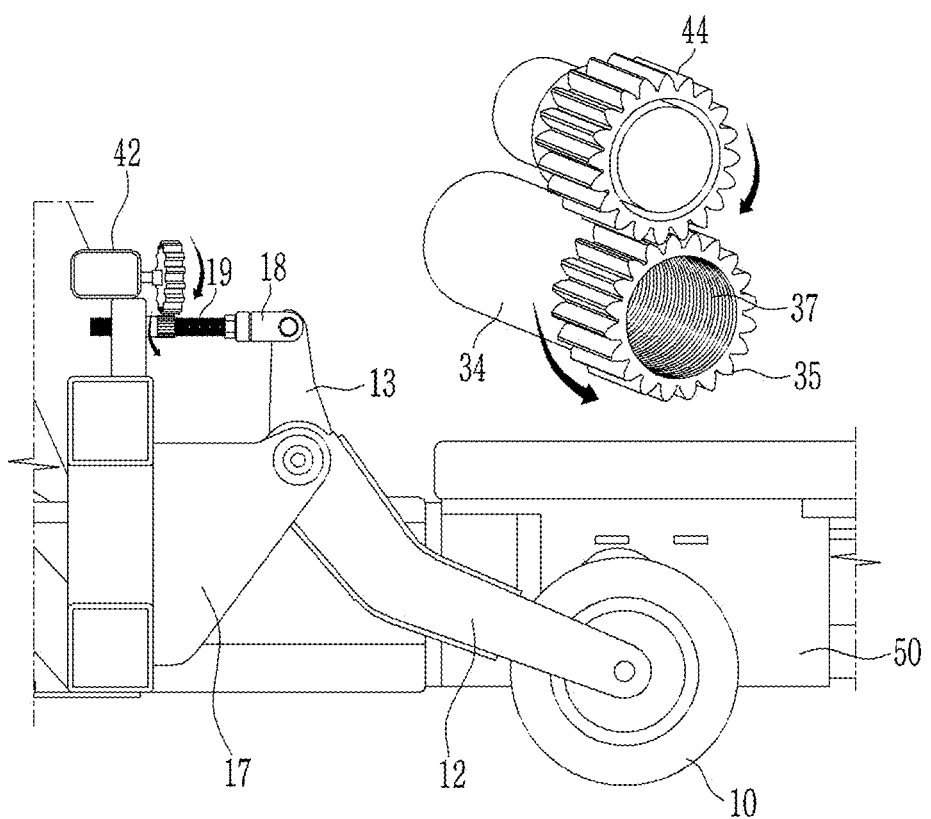
FIG. 6 is a view illustrating a state in which the wheel is being contained in the link structure for a wheel according to an embodiment of the present disclosure.
Figure 7:
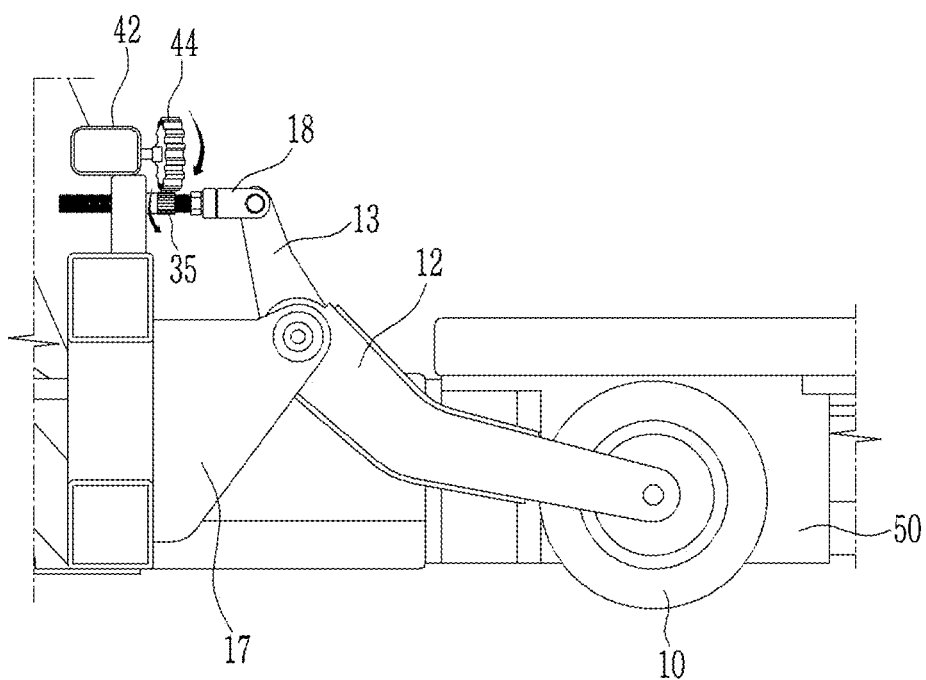
FIG. 7 is a view illustrating a state after the wheel is contained in the link structure for a wheel according to an embodiment of the present disclosure.

FIG. 6 is a view illustrating a state in which the wheel is being contained in the link structure for a wheel according to an embodiment of the present disclosure, and FIG. 7 is a view illustrating a state after the wheel is contained in the link structure for a wheel according to an embodiment of the present disclosure.

In an embodiment of the present disclosure, the vehicle may be the PBV including the drive module 100 and the space module 200 detachably attached to the rear side of the drive module 100. The wheel 10 may be an auxiliary wheel provided at the rear side of the drive module 100.

A wheel containing part 50 may be provided in the space module 200. With reference to FIGS. 5 to 7, when the motor gear 44 begins to rotate as the motor 42 operates in the state in which the drive module 100 and the space module 200 are coupled, the rotary gears 35 and 37, which engage with the motor gear 44, rotate, and the third link 18 inserted and connected into the inner peripheral surface of the rotary gears 35 and 37 rectilinearly moves. In this case, the motor gear 44 may rotate in a direction in which the third link 18 rectilinearly moves toward the drive module 100.

As illustrated in FIG. 6, because of the engagement between the outer peripheral surface of the motor gear 44 and the gear teeth 35 formed on the outer peripheral surface, the rotation direction of the motor gear 44 and the rotation direction of the rotary shaft of the rotary gears 35 and 37 may be opposite to each other. When the third link 18 begins to rectilinearly move toward the drive module 100, the second link 13 and the first link 12, which are connected to the third link 18, turn about the link fixing part 17, such that the auxiliary wheel 10 begins to move upward.

As illustrated in FIG. 7, when the third link 18 sufficiently moves toward the drive module 100, the second link 13 and the first link 12 sufficiently turn to be disposed in a direction close to the horizontal direction of the vehicle body, such that the auxiliary wheel 10 is sufficiently moved upward, and the auxiliary wheel 10 is contained in the wheel containing part 50. In the state in which the auxiliary wheel 10 is completely contained in the wheel containing part 50, the auxiliary wheel 10 may be hidden without being in contact with the ground surface so that the auxiliary wheel 10 is invisible from the outside.

In order to separate and independently dispose the drive module 100 and the space module 200, the process illustrated in FIGS. 5 to 7 is performed in the reverse order. That is, when the motor gear 44 rotates in a direction opposite to the above-mentioned direction as the motor 42 operates, the rotary gears 35 and 37, which engage with the motor gear 44, rotate, and the third link 18 rectilinearly moves in the direction opposite to the drive module 100. When the third link 18 begins to rectilinearly move in the direction opposite to the drive module 100, the second link 13 and the first link 12 turn about the link fixing part 17 and move the auxiliary wheel 10 downward. When the third link 18 sufficiently moves toward a side opposite to the drive module 100, the second link 13 and the first link 12 turn sufficiently, and the auxiliary wheel 10 is withdrawn from the wheel containing part 50.

Figure 8:
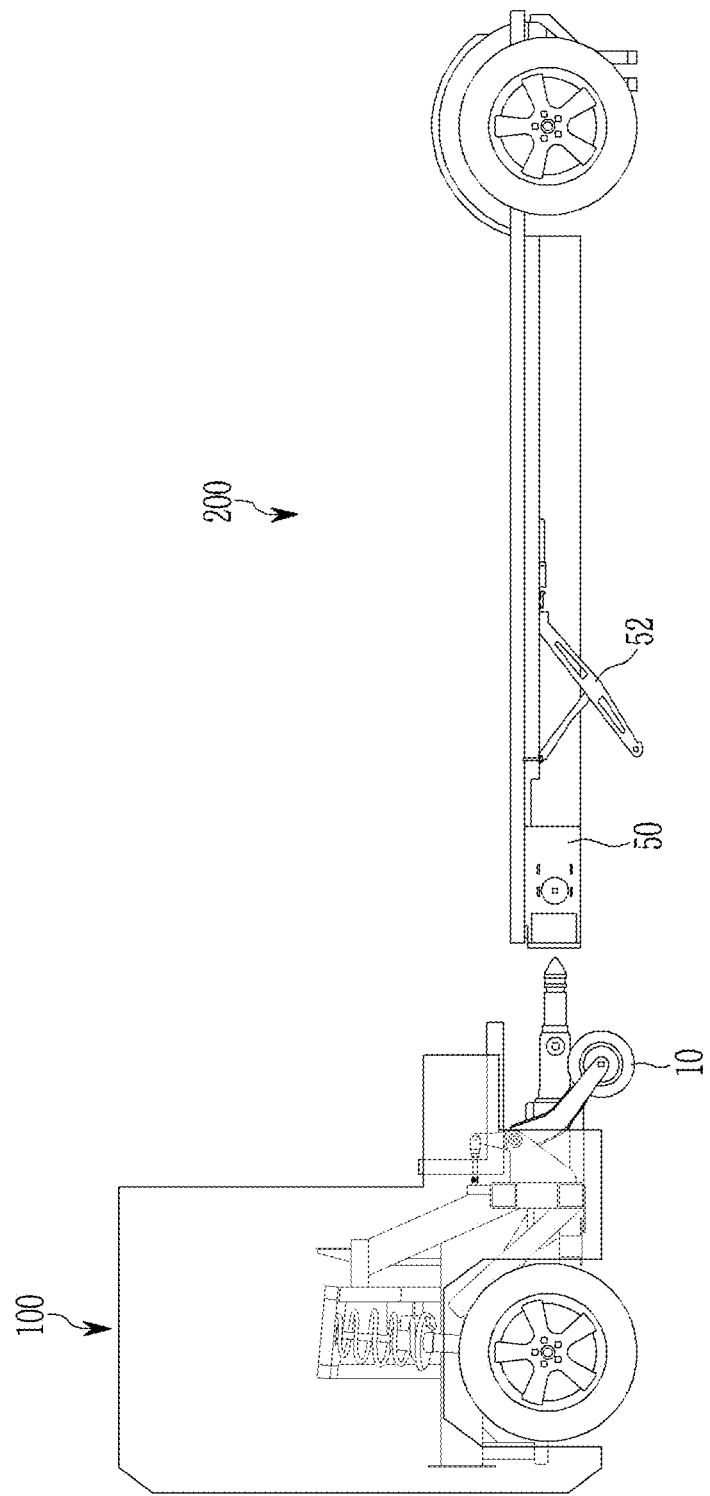
FIG. 8 is a view illustrating a state before the wheel is contained in a PBV that includes a drive module and a space module and adopts the link structure for a wheel according to an embodiment of the present disclosure.
Figure 9:
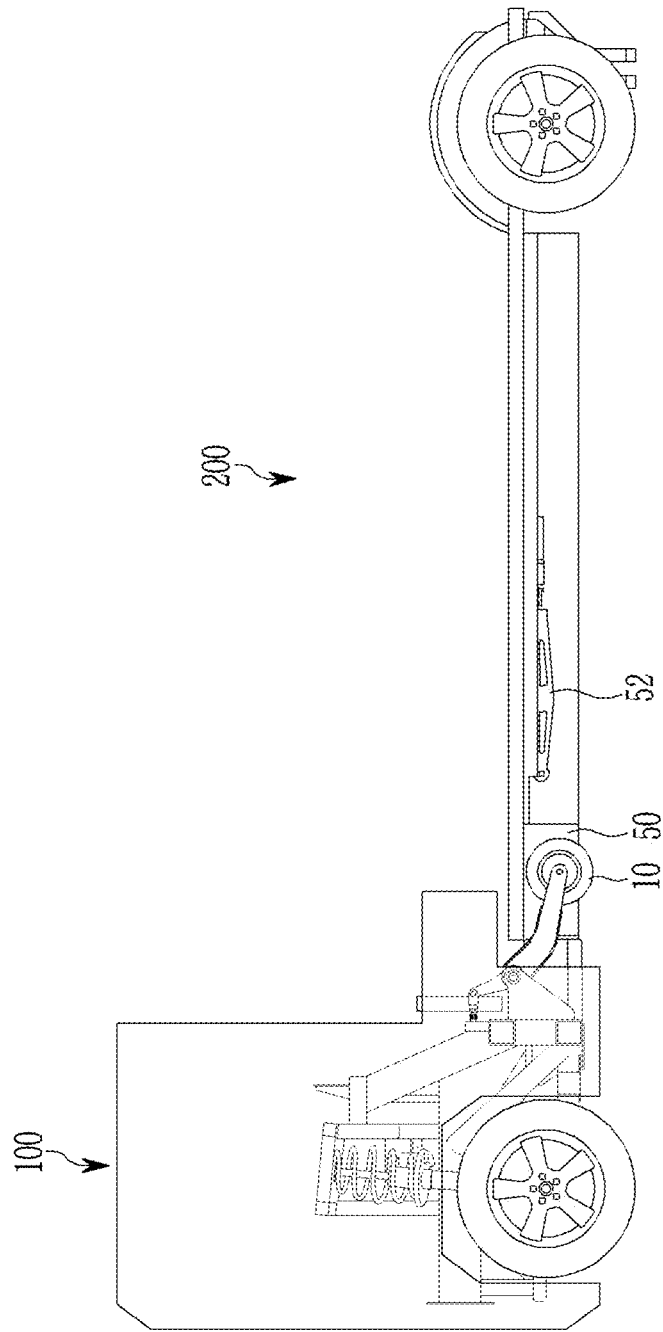
FIG. 9 is a view illustrating a state after the wheel is contained in the PBV that includes the drive module and the space module and adopts the link structure for a wheel according to an embodiment of the present disclosure.

FIG. 8 is a view illustrating a state before the wheel is contained in the PBV that includes the drive module and the space module and adopts the link structure for a wheel according to an embodiment of the present disclosure, and FIG. 9 is a view illustrating a state after the wheel is contained in the PBV that includes the drive module and the space module and adopts the link structure for a wheel according to an embodiment of the present disclosure.

With reference to FIG. 8, before the drive module 100 and the space module 200 are coupled, the auxiliary wheel 10 provided on the drive module 100 is exposed to the outside and in contact with the ground surface, and the space module 200 is supported by a space module support 52 provided below the space module 200, such that the drive module 100 and the space module 200 are independently positioned while being supported on the ground surface.

As illustrated in FIG. 9, when the drive module 100 and the space module 200 are coupled, the space module support 52 is raised toward a bottom surface of the space module 200 while being bent and then fixed to the bottom surface of the space module 200. The motor 42 operates at a time point equal to the time point at which the space module support 52 is raised, such that the auxiliary wheel 10 is turned upward and contained in the wheel containing part 50.

In case that the drive module 100 and the space module 200 are separated, the above-mentioned process is performed in the reverse order, such that the auxiliary wheel 10 is withdrawn from the wheel containing part 50 and supports the drive module 100, and the space module support 52 is unfolded and supports the space module 200.

Figure 10:
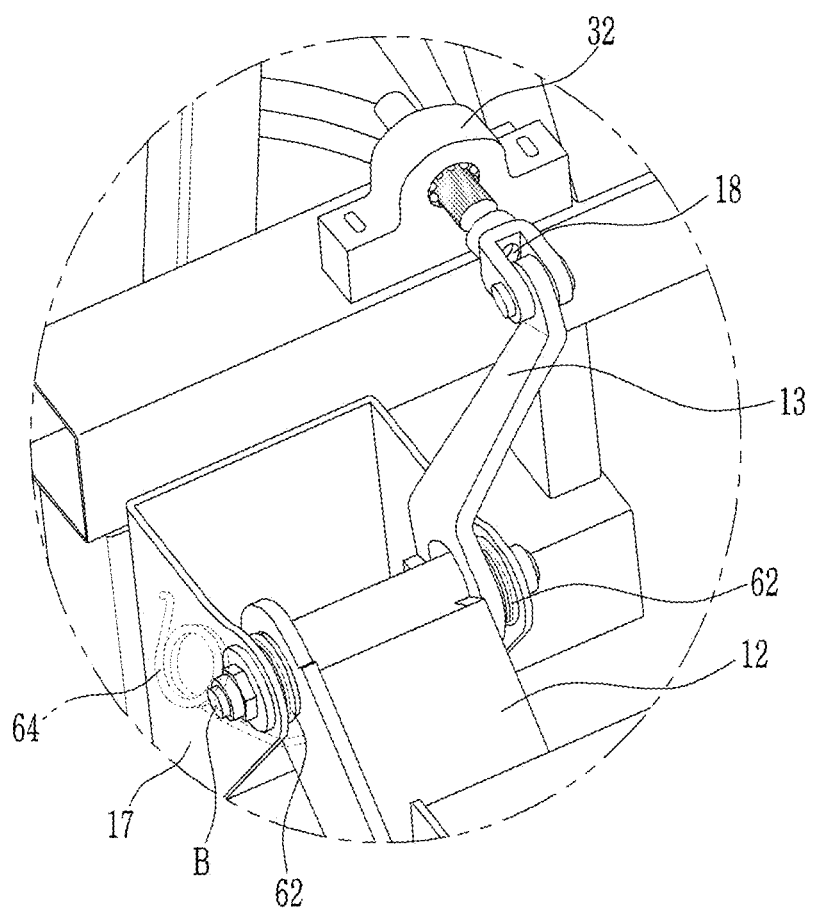
FIG. 10 is a view illustrating a state in which a spring stopper is applied to the link structure for a wheel according to an embodiment of the present disclosure.
Figure 11:
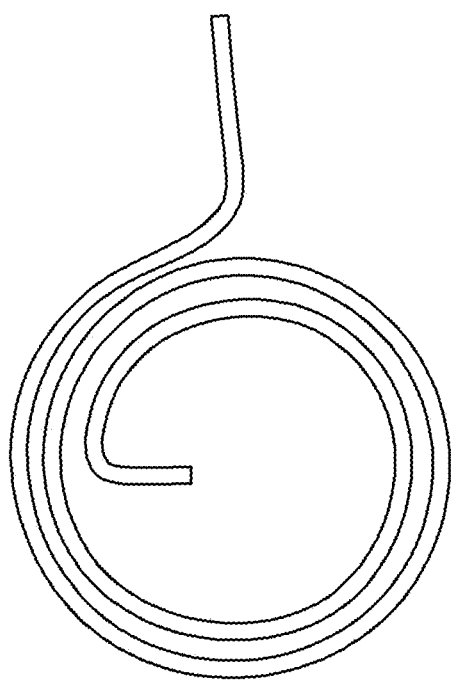
FIG. 11 is a view illustrating a first spring stopper applied to the link structure for a wheel according to an embodiment of the present disclosure.
Figure 12:
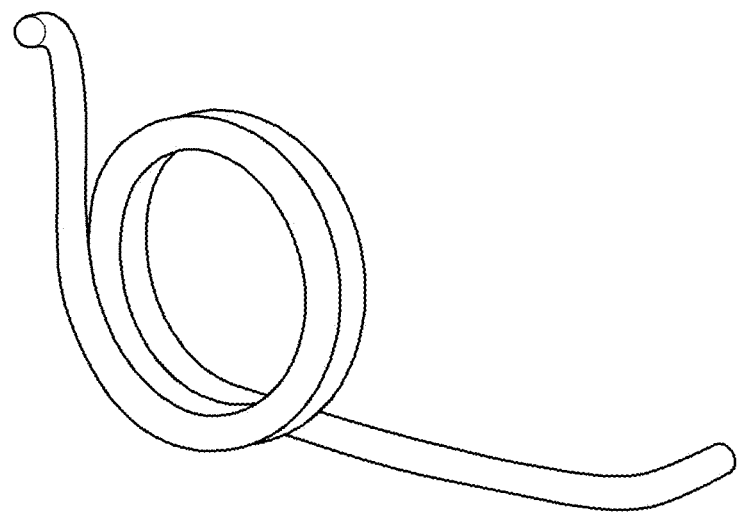
FIG. 12 is a view illustrating a second spring stopper applied to the link structure for a wheel according to an embodiment of the present disclosure.

FIG. 10 is a view illustrating a state in which a spring stopper is applied to the link structure for a wheel according to an embodiment of the present disclosure, FIG. 11 is a view illustrating a first spring stopper applied to the link structure for a wheel according to an embodiment of the present disclosure, and FIG. 12 is a view illustrating a second spring stopper applied to the link structure for a wheel according to an embodiment of the present disclosure.

With reference to FIG. 10, a first spring stopper 62 may be wound around a rotary shaft between an outer surface of the other end of the first link 12 and an inner surface of the link fixing part 17 and may provide an elastic force to assist in fixing the wheel 10.

In addition, a second spring stopper 64 having two opposite ends, which are fixed to the outer surface of the other end of the first link 12 and the inner surface of the link fixing part 17, may be installed to provide an elastic force to assist in fixing the wheel 10.

The first spring stopper 62 and the second spring stopper 64 may serve to allow the first link 12 to apply a force toward the lower side of the vehicle body in the state in which the wheel 10 is moved toward the lower side of the vehicle body, thereby assisting a force generated when the motor part 40 and the gear part 30 are coupled.

As illustrated in FIG. 11, the first spring stopper 62 may have a protruding shape so that the two opposite ends thereof are in contact with and supported on the second link 13 and the rotary shaft of the link fixing part 17. In addition, as illustrated in FIG. 12, the second spring stopper 64 may have a protruding shape so that the two opposite ends thereof are fixedly coupled to the inner surface of the link fixing part 17 and the lateral surface of the first link 12.

As described above, according to embodiments of the present disclosure, the compact link structure is applied to contain the auxiliary wheel provided on the drive module when the drive module and the space module of the PBV are coupled to each other, thereby significantly reducing the occupation space.

In addition, the number of components of the link structure may be reduced, which may reduce the total weight and costs.

In addition, the simple operating method may be applied, which may improve durability and reduce the probability of a device being broken down.

While exemplary embodiments of the present disclosure have been described, the present disclosure is not limited to the embodiments. The present disclosure covers all modifications that can be easily made from the embodiments of the present disclosure by those skilled in the art and considered as being equivalent to the present disclosure.

The following reference identifiers may be used in connection with the figures to describe various features of embodiments of the present disclosure.

| | |
|---|---|
| 100: Drive module | 200: Space module |
| 10: Auxiliary wheel | 12: First link |
| 13: Second link | 18: Third link |
| 17: Link fixing part | 19: Link screw thread |
| 30: Gear part | 32: Gear fixing part |
| 34: Rotary shaft | 35, 37: Rotary gear |
| 35: Gear teeth | 36: Ball bearing |
| 37: Gear screw thread | 40: Motor part |
| 42: Motor | 44: Motor gear |
| 50: Wheel containing part | 52: Space module support |
| 62: First spring stopper | 64: Second spring stopper |

What is claimed is:

1. A link structure for a wheel of a vehicle, the link structure comprising:
   a first link having a first end connected to a center of the wheel;
   a second link having a first end connected to a second end of the first link;
   a third link having a first end connected to a second end of the second link;
   a gear part connected to a second end of the third link and configured to allow the third link to move rectilinearly; and
   a motor part connected to the gear part and configured to provide a rotational force to the gear part.

2. The link structure of claim 1, wherein the second end of the first link and the first end of the second link are connected to a link fixing part disposed on a lateral portion of a vehicle body of the vehicle such that the second end of the first link and the first end of the second link are turnable in an upward/downward direction of the vehicle body while sharing a same rotation axis.

3. The link structure of claim 2, further comprising a first spring stopper wound around a rotary shaft between an outer surface of the second end of the first link and an inner surface of the link fixing part, wherein the first spring stopper is configured to provide an elastic force to assist in fixing the wheel.

4. The link structure of claim 2, further comprising a second spring stopper configured to provide an elastic force to assist in fixing the wheel, the second spring stopper having a first end fixed to an outer surface of the second end of the first link and a second, opposite end fixed to an inner surface of the link fixing part.

5. A link structure for a wheel of a vehicle, the link structure comprising:
   a first link having a first end connected to a center of the wheel;
   a second link having a first end connected to a second end of the first link;

a third link having a first end connected to a second end of the second link;

a gear part connected to a second end of the third link and configured to allow the third link to move rectilinearly, wherein the gear part is fixedly installed at a rear end of a vehicle body of the vehicle toward a rear side of the vehicle; and a motor part connected to the gear part and configured to provide a rotational force to the gear part.

6. The link structure of claim 5, wherein the gear part comprises:

a gear fixing part fixedly installed on the vehicle body and having an opening disposed in a central portion thereof, the opening extending in a longitudinal direction of the vehicle body;

a rotary shaft inserted into the opening of the gear fixing part and configured to rotate in the opening; and a rotary gear disposed at an end of the rotary shaft and comprising an outer peripheral surface on which gear teeth are disposed and an inner peripheral surface on which a gear screw thread is disposed.

7. The link structure of claim 6, wherein the gear part further comprises a ball bearing interposed between the rotary shaft and the opening and configured to support the rotary shaft such that the rotary shaft rotates.

8. The link structure of claim 7, wherein the third link is inserted into the inner peripheral surface of the rotary gear and is configured to move rectilinearly in a forward/rearward direction of the vehicle body in accordance with a rotation of the rotary gear.

9. The link structure of claim 8, wherein a link screw thread is disposed on an outer peripheral surface of the third link and coupled to the gear screw thread disposed on the inner peripheral surface of the rotary gear.

10. The link structure of claim 6, wherein the motor part comprises:

a motor fixedly installed on the vehicle body above the link fixing part; and a motor gear connected to the rotary shaft of the motor and protruding toward the rotary gear of the gear part.

11. The link structure of claim 10, wherein the rotary gear of the gear part is in contact with the motor gear.

12. The link structure of claim 11, wherein, in a state in which the motor gear rotates as the motor operates, the rotary gear of the gear part rotates, and the third link coupled to the rotary gear of the gear part rectilinearly moves, such that the first link and the second link operate to turn in an upward/downward direction of the vehicle body.

13. The link structure of claim 5, wherein the second end of the first link and the first end of the second link are connected to a link fixing part disposed on a lateral portion of the vehicle body.

14. The link structure of claim 13, further comprising a first spring stopper wound around a rotary shaft between an outer surface of the second end of the first link and an inner surface of the link fixing part, wherein the first spring stopper is configured to provide an elastic force to assist in fixing the wheel.

15. The link structure of claim 13, further comprising a second spring stopper configured to provide an elastic force to assist in fixing the wheel, the second spring stopper having a first end fixed to an outer surface of the second end of the first link and a second, opposite end fixed to an inner surface of the link fixing part.

16. A vehicle comprising:

a vehicle body comprising a drive module and a space module detachably attached to a rear side of the drive module;

a wheel coupled to the vehicle body; and a link structure for the wheel, the link structure comprising:

a first link having a first end connected to a center of the wheel;

a second link having a first end connected to a second end of the first link;

a third link having a first end connected to a second end of the second link;

a gear part connected to a second end of the third link and configured to allow the third link to move rectilinearly; and a motor part connected to the gear part and configured to provide a rotational force to the gear part.

17. The vehicle of claim 16, wherein:

the wheel comprises an auxiliary wheel disposed at the rear side of the drive module;

the auxiliary wheel is turned upward and contained in a wheel containing part disposed in the space module in a state in which the drive module and the space module are coupled; and the auxiliary wheel is turned downward and exposed from a lower portion of the vehicle body in a state in which the drive module and the space module are uncoupled.

18. The vehicle of claim 16, wherein the second end of the first link and the first end of the second link are connected to a link fixing part disposed on a lateral portion of the vehicle body.

19. The vehicle of claim 18, further comprising a first spring stopper wound around a rotary shaft between an outer surface of the second end of the first link and an inner surface of the link fixing part, wherein the first spring stopper is configured to provide an elastic force to assist in fixing the wheel.

20. The vehicle of claim 18, further comprising a second spring stopper configured to provide an elastic force to assist in fixing the wheel, the second spring stopper having a first end fixed to an outer surface of the second end of the first link and a second, opposite end fixed to an inner surface of the link fixing part.

* * * * *